Patented Jan. 6, 1925.

1,521,657

UNITED STATES PATENT OFFICE.

MERWYN C. TEAGUE, OF ELMHURST, NEW YORK, ASSIGNOR TO AMERICAN RUBBER COMPANY, OF EAST CAMBRIDGE, MASSACHUSETTS, A CORPORATION OF MASSACHUSETTS.

PROCESS FOR MOLDING RUBBER ARTICLES AND ARTICLES PRODUCED THEREBY.

No Drawing.  Application filed November 22, 1923. Serial No. 676,347.

*To all whom it may concern:*

Be it known that I, MERWYN C. TEAGUE, a citizen of the United States, residing in Elmhurst, Long Island, county of Queens, State of New York, have invented certain new and useful Improvements in Processes for Molding Rubber Articles and Articles Produced Thereby, of which the following is a full, clear, and exact description.

This invention relates to a process for molding rubber articles and articles produced thereby.

One of the objects of the invention is to provide a simple, inexpensive process for molding whereby the long period of heating under pressure in the mold for shaping and vulcanizing heretofore employed for molding articles containing rubber, shall be substantially lessened. Another object of the invention is to provide a series of useful, inexpensive, molded articles having a good appearance and generally faithful reproduction of even the more intricate designs.

The invention accordingly comprises a process for making molded rubber articles which includes mixing a compounding ingredient and rubber in the presence of a liquid dispersing medium in a proportion such that the resultant mass is substantially dry to the touch, without drying the mass placing it in a mold, molding the mass, removing the molded mass, and drying and preferably vulcanizing the molded mass. The invention also comprises articles formed by the process indicated. The expression "in the presence of a liquid" is intended to include either rubber dispersed in an organic solvent—an oil—such as solvent naphtha, benzol, etc., with which dispersion water is preferably combined; or the naturally dispersed rubber—latex—either in its normal form as obtained from the trees or concentrated or diluted as desired with which such a solvent has been combined.

A process constituting an embodiment of the invention is as follows: The following ingredients in about the proportions named are mixed together in a mixer, preferably of the Werner and Pfleiderer type:

100 parts of dry rubber as latex.
200 parts of superfine wood flour.
100 parts of ground flint or burned clay.
20 parts of green earth pigment (R. M. green).
25 parts of Montan wax.
30 parts of zinc oxide.
40 parts of sulphur.
4 parts of carbon bisulphide.
4 parts of dibenzylamine.
150 parts of solvent naphtha.
50 parts of boiled linseed oil.

In mixing these the following order should be observed: The wood flour, the ground flint or burned clay, the green pigment, sulphur and zinc oxide are mixed together prior to adding the solvent naphtha and linseed oil. Naphtha and linseed oil are then added. The Montan wax in powdered form is then put in followed by the addition of the latex. The carbon bisulphide and dibenzylamine are then added separately after all of the other ingredients. The method of combining the materials with latex may be varied somewhat. For instance the ingredients other than the oil may be added to the latex and the oil subsequently added to this mixture; or the oil may be added to the latex and then the other compounding ingredients may be added. The mixing is continued for a short time and is facilitated by slightly heating the composition with live steam to about 40° C. By this procedure the entire mixing operation is usually complete in about 5 minutes after which the compound is ready for molding. The material in the form given at this stage of the process is substantially dry to the touch. It usually consists of a number of lumps of varying sizes which may be readily picked up in the hand and which if pressed hard will adhere to the fingers.

This mass so obtained is then placed in a sectional mold to which a small pressure may be applied. Before placing in the mold it may be desirable to form a blank of the material. This is particularly the case where the mold has one or more long unbroken surfaces upon which a blank sheet of material may be molded into a more even surface than where lumps of material are employed. After placing the material in the mold the sections are closed and a slight pressure is applied. Ordinarily no heat is applied although some heat may be used if desired. If heat is employed usually only a low temperature, about 40° C., is used. Molding, employing a slightly elevated temperature might be resorted to employing the composition given in the example above but using instead of 50 parts of linseed oil and 150 parts of solvent naphtha, 40 parts of linseed oil and 125 parts of solvent naphtha, the remaining ingredients being the same. The compound thus produced is slightly stiffer than the compound produced in the example and if the mold is heated, say to 40° C., the composition flows more readily into its design than without heating. Whether or not heat is employed the sections of the mold are brought together under the above conditions and immediately separated at which time the molded form is removed. Substantially its final shape is preferably given to the article by this molding. As stated above the molded article is of such consistency as will permit the immediate removal from the mold and necessary handling.

The molded articles as such are then placed in a drying oven (that is the composition is dried without the presence of the mold) and heated to say 150° F. for 1 to 15 hrs. depending upon the size and shape of the article.

At this time the volatile solvents will have been evaporated and the temperature may be increased to say 212° F. for 10 to 30 hrs. depending upon the size and shape of the article and whether or not it is to be vulcanized to the hard rubber stage. It is understood that the drying and vulcanizing conditions may be varied over a considerable range of temperature and time.

Instead of employing latex in the composition, rubber cement may be used. Such composition is as follows:

100 parts of dry rubber by weight as a 36% solution of pale crêpe rubber in solvent naphtha.

200 parts of superfine wood flour.

10 parts of cotton linters.

15 parts of zinc oxide.

15 parts of coloring matter (Persian orange).

50 parts of 2% soap solution (soap dissolved in water).

2 parts of sulphur.

1 part of oxy normal butyl thiocarbonic acid disulphide.

1 part of dibenzylamine.

The wood flour, zinc oxide, coloring matter and sulphur are intimately mixed in preferably a Werner-Pfleiderer mixer after which the rubber cement and the soap solution are added. (The soap solution is here used instead of water alone to facilitate the mixing of the composition.) To this the cotton linters are gradually added in small portions. The oxy normal butyl thiocarbonic acid disulphide and dibenzylamine are then added separately and the mixing continued to insure uniform distribution. This mixing may be facilitated by slightly warming the mixer. The compound is then removed and sheeted if desired before being placed in a mold. The molding, drying and vulcanizing operations are carried out in the same manner as above described. Vulcanization of this composition usually occurs during the drying period, an extra vulcanization period being unnecessary.

Instead of the compounding ingredients mentioned in the examples given above, various others may be employed, for instance replacing wood flour and cotton linter by various fibres such as wool, hemp and silk scrap. Various types of pigments or dyestuffs may be substituted for those given in these examples. In place of the vulcanizing ingredients mentioned including sluphur. zinc in combination, carbon bisulphide and dibenzylamine, various other vulcanizing ingredients may be employed. Montan wax may be replaced by carnauba wax or similar substance. Solvent naphtha as added to the latex or as employed as a solvent for the cement may be replaced by benzol, gasoline, kerosene or similar solvent. In the first example given above linseed oil may be replaced by other drying oils such as rape oil, soya bean oil, tung oil. Oils such as these are preferably used in compounds where hard rubber is produced, as in the first of the above examples. A soft rubber is produced by the second of the above examples, and here linseed oil is preferably replaced by a further quantity of material such as solvent naphtha.

The process it will be observed is a rapid efficient one, as compared with the usual process of molding under heat and pressure. It presents a great economy in that no heat or a very little heat is employed while in the ordinary molding processes relatively high heats are used. In addition the molds ordinarily employed formerly, had to withstand high pressure which is not the case in the present process. In addition the old process causes considerable capital to be employed in providing molds and due to the fact that the molding period is a relatively long one more molds are required than in the present process. In the present process, as stated above, the article is removed almost immediately after molding and may be heated outside the mold as described. The articles thus made have a good appearance, fathfully represent even the more intricate mold surfaces and are inexpensive.

As many apparently widely different embodiments of this invention may be made without departing from the spirit thereof, it will be understood that I do not intend to limit myself to the specific embodiment herein set forth except as indicated in the appended claims.

Having thus described my invention, what I claim and desire to protect by Letters Patent is:

1. A process for making molded rubber articles which comprises mixing rubber in the presence of a liquid with a compounding ingredient in a proportion such that the resultant mass is substantially dry to the tonch, without drying the mass placing it in a mold, molding the mass, removing the molded mass, and drying the molded mass.

2. A process for making molded rubber articles which comprises mixing a compounding ingredient with rubber in the presence of water and oil in a proportion such that the resultant mass is substantially dry to the touch, without drying the mass placing it in a mold, molding the mass, removing the molded mass, and drying and vulcanizing the molded mass.

3. A process for making molded rubber articles which comprises mixing a compounding ingredient with rubber dispersed in water and an organic solvent in a proportion such that the resultant mass is substantially dry to the touch, without drying the mass placing it in a mold, molding the mass, removing the molded mass, and drying and vulcanizing the molded mass.

4. A process for making molded rubber articles which comprises mixing cellulose material with rubber dispersed in oil and water in a proportion such that the resultant mass is substantially dry to the touch, without drying the mass placing it in a mold, molding the mass, removing the molded mass, and drying and vulcanizing the molded mass.

5. A process for making molded rubber articles which comprises mixing compounding ingredients, rubber dispersed in a liquid and a vulcanizing ingredient in proportion such that the resultant mass is substantially dry to the touch, without drying the mass placing it in a mold, molding the mass, removing the molded mass, and drying and vulcanizing the molded mass.

6. A process for making molded rubber articles which comprises combining a cellulose material, a mineral compounding ingredient, rubber, oil, water and a vulcanizing agent in proportions such that the resultant mass is substantially dry to the touch, without drying the mass placing it in a mold, molding the mass, removing the molded mass, and drying and vulcanizing the molded mass.

7. A process for making molded rubber articles which comprises mixing rubber with a mineral compounding ingredient in the presence of a liquid in a proportion such that the resultant mass is substantially dry to the touch, without drying the mass placing it in a mold, molding the mass at substantially room temperature, removing the molded mass, drying the molded mass at approximately 65° C., and vulcanizing the mass.

8. A process for making molded rubber articles which comprises mixing wood flour, rubber, oil, water, a coloring matter, vulcanizing ingredients in a proportion such that the resulting mass is substantially dry to the touch, without drying the mass placing it in a mold, molding the mass under slight pressure, removing the molded mass, drying the moulded mass at about 65° C. and vulcanizing the mass.

9. A rubber article molded directly to substantially its final form from a compounding ingredient and rubber dispersed in a liquid, and dried after removal from the mold.

10. A rubber article molded directly to substantially its final form from a compounding ingredient, rubber, oil and water, dried after removal from the mold, and vulcanized.

11. A rubber article molded directly to substantially its final form from compounding ingredients, rubber dispersed in a liquid and a vulcanizing ingredient, dried after removal from the mold, and vulcanized.

12. A rubber article molded directly to substantially its final form from wood flour, rubber, oil, water, coloring matter and vulcanizing ingredients, dried at approximately 65° C. after removal from the mold, and vulcanized.

Signed at New York, New York, this 17th day of November, 1923.

MERWYN C. TEAGUE.